United States Patent
Suciu et al.

(10) Patent No.: US 10,927,763 B2
(45) Date of Patent: Feb. 23, 2021

(54) CONDITIONED LOW PRESSURE COMPRESSOR COMPARTMENT FOR GAS TURBINE ENGINE

(71) Applicant: United Technologies Corporation, Farmington, CT (US)

(72) Inventors: Gabriel L. Suciu, Glastonbury, CT (US); Kurt J. Sobanski, Glastonbury, CT (US); William K. Ackermann, East Hartford, CT (US)

(73) Assignee: RAYTHEON TECHNOLOGIES CORPORATION, Waltham, MA (US)

(*) Notice: Subject to any disclaimer, the term of this patent is extended or adjusted under 35 U.S.C. 154(b) by 708 days.

(21) Appl. No.: 15/091,186

(22) Filed: Apr. 5, 2016

(65) Prior Publication Data
US 2017/0284298 A1   Oct. 5, 2017

(51) Int. Cl.
*F02C 7/00* (2006.01)
*F02C 7/18* (2006.01)
(Continued)

(52) U.S. Cl.
CPC ............... *F02C 7/18* (2013.01); *F01D 25/12* (2013.01); *F02C 7/32* (2013.01); *F02C 9/18* (2013.01);
(Continued)

(58) Field of Classification Search
CPC .... F02C 7/18; F02C 7/32; F02C 7/047; F02C 6/08; F01D 25/12; F02K 3/06; B64D 2033/0233
See application file for complete search history.

(56) References Cited

U.S. PATENT DOCUMENTS

| 4,601,202 A * | 7/1986 | Colman | F01D 17/02 361/703 |
| 2009/0175718 A1 * | 7/2009 | Diaz | F01D 25/12 415/180 |

(Continued)

FOREIGN PATENT DOCUMENTS

| FR | 2955896 A1 | 8/2011 |
| FR | 2955897 A1 | 8/2011 |

(Continued)

OTHER PUBLICATIONS

European Search Report Issued in EP Application No. 17163620.2, dated Aug. 29, 2017, 7 pages.

*Primary Examiner* — Todd E Manahan
*Assistant Examiner* — Edwin Kang
(74) *Attorney, Agent, or Firm* — Cantor Colburn LLP

(57) ABSTRACT

A low pressure compressor for a gas turbine engine includes a low pressure compressor case extending circumferentially around a central axis of the gas turbine engine. The low pressure compressor case includes an inner radial wall surrounding a low pressure compressor rotor and an outer radial wall at least partially defining a fan bypass passage of the gas turbine engine. A low pressure compressor compartment is located between the inner radial wall and the outer radial wall and an electrical component is located in the low pressure compressor compartment. An inlet port at the outer radial wall is configured to admit a cooling airflow into the low pressure compressor compartment from the fan bypass passage to cool the electrical component.

14 Claims, 3 Drawing Sheets

(51) Int. Cl.
  *F02K 3/065* (2006.01)
  *F02C 7/32* (2006.01)
  *F02C 9/18* (2006.01)
  *F01D 25/12* (2006.01)
  *F02K 3/06* (2006.01)

(52) U.S. Cl.
  CPC ............... *F02K 3/06* (2013.01); *F02K 3/065* (2013.01); *Y02T 50/60* (2013.01)

(56) References Cited

U.S. PATENT DOCUMENTS

| | | | | |
|---|---|---|---|---|
| 2009/0317229 | A1* | 12/2009 | Suciu | F02C 9/20 |
| | | | | 415/1 |
| 2013/0175001 | A1* | 7/2013 | Cheong | F02C 6/08 |
| | | | | 165/41 |
| 2013/0239584 | A1* | 9/2013 | Suciu | F01D 15/08 |
| | | | | 60/792 |
| 2014/0144151 | A1* | 5/2014 | Bifulco | B08B 3/02 |
| | | | | 60/772 |
| 2016/0024964 | A1* | 1/2016 | Weiner | F02C 7/14 |
| | | | | 415/1 |
| 2017/0159490 | A1* | 6/2017 | Sennoun | F01D 25/14 |
| 2017/0191420 | A1* | 7/2017 | Clarke | F01D 17/085 |

FOREIGN PATENT DOCUMENTS

| | | | | |
|---|---|---|---|---|
| WO | 2014051678 A1 | 4/2014 | | |
| WO | WO-2014051678 A1 * | 4/2014 | ........... | F01D 17/105 |
| WO | 2014151685 A1 | 9/2014 | | |
| WO | WO 2014151685 A1 * | 9/2014 | ............... | F02C 7/14 |

\* cited by examiner

CONDITIONED LOW PRESSURE COMPRESSOR COMPARTMENT FOR GAS TURBINE ENGINE

BACKGROUND

This disclosure relates to gas turbine engines, and more particularly to the provision of cooling air for internal components of gas turbine engines.

Electrical components are by their nature sensitive to temperature and thermal cycling. As a result, it is desired to keep the electrical components relatively cool and within a small temperature range in order to function properly and to extend the useful service life of the electrical components. While the use of electrical components such as electric oil and fuel pumps, vane actuators, bleed port actuators, electric valves or the like, in gas turbine engines can have performance advantages over their mechanical counterparts, their use can be limited due to the difficulty in maintaining a desired environmental temperature for the electrical components.

In some gas turbine engines, electrical components are sometimes located at engine nacelle components, such as the fan case of the gas turbine engine. While this location may limit the maximum temperature the electrical components are subject to, it does not prevent the undesirable thermal cycling. For example, during operations on or near the ground, the electrical components at the fan case may be subjected to a maximum temperature of about 190 degrees Fahrenheit. When the aircraft the gas turbine engine is fixed to climbs to 30,000 feet of altitude, the temperature at the electrical component on the fan case may be about −50 degrees Fahrenheit. Such thermal cycling of the electrical component induces stresses in joints of the component, limiting the service life of the component. Further, mounting the electrical components at the fan case typically raises a profile of the fan case, increasing aerodynamic drag of the fan case.

SUMMARY

In one embodiment, a low pressure compressor for a gas turbine engine includes a low pressure compressor case extending circumferentially around a central axis of the gas turbine engine. The low pressure compressor case includes an inner radial wall surrounding a low pressure compressor rotor and an outer radial wall at least partially defining a fan bypass passage of the gas turbine engine. A low pressure compressor compartment is located between the inner radial wall and the outer radial wall and an electrical component is located in the low pressure compressor compartment. An inlet port at the outer radial wall is configured to admit a cooling airflow into the low pressure compressor compartment from the fan bypass passage to cool the electrical component.

Additionally or alternatively, in this or other embodiments an outlet port is positioned at the outer radial wall axially downstream of the one or more inlet ports to reintroduce the cooling airflow to the fan bypass passage.

Additionally or alternatively, in this or other embodiments the electrical component is one or more of an electric oil pump, an electric fuel pump, an electric low pressure compressor vane actuator, an electric bleed actuator, an electric ACC valve, or an electronic enclosure such as an electronic engine control component or a health monitoring unit.

Additionally or alternatively, in this or other embodiments a flow controller is located at the inlet port to control airflow through the inlet port.

Additionally or alternatively, in this or other embodiments the inlet port and the outlet port are configured to maintain a low pressure compressor compartment temperature of less than an upper operational limit of the electrical component.

Additionally or alternatively, in this or other embodiments a bleed pathway extends through the low pressure compressor compartment to direct a bleed airflow from the low pressure compressor to the fan bypass passage.

Additionally or alternatively, in this or other embodiments a bleed pathway outlet at the outer radial wall is axially downstream from the outlet port.

Additionally or alternatively, in this or other embodiments the bleed airflow is isolated from the cooling airflow.

In another embodiment, a gas turbine engine includes a combustor and a compressor to provide a compressed airflow to the combustor. The compressor includes a high pressure compressor and a low pressure compressor including a low pressure compressor case extending circumferentially around a central axis of the gas turbine engine. The low pressure compressor case has an inner radial wall surrounding a low pressure compressor rotor and an outer radial wall at least partially defining a fan bypass passage of the gas turbine engine. A low pressure compressor compartment is located between the inner radial wall and the outer radial wall, and an electrical component is positioned in the low pressure compressor compartment. An inlet port is located at the outer radial wall configured to admit a cooling airflow into the low pressure compressor compartment from the fan bypass passage to cool the electrical component.

Additionally or alternatively, in this or other embodiments an outlet port is located at the outer radial wall axially downstream of the one or more inlet ports to reintroduce the cooling airflow to the fan bypass passage.

Additionally or alternatively, in this or other embodiments the electrical component is one or more of an electric oil pump, an electric fuel pump, an electric low pressure compressor vane actuator, an electric bleed actuator, an electric ACC valve, or an electronic enclosure such as an electronic engine control component or a health monitoring unit.

Additionally or alternatively, in this or other embodiments a flow controller is located at the inlet port to control airflow through the inlet port.

Additionally or alternatively, in this or other embodiments the inlet port and the outlet port are configured to maintain a low pressure compressor compartment temperature below an operational limit of the electrical component.

Additionally or alternatively, in this or other embodiments a bleed pathway extends through the low pressure compressor compartment to direct a bleed airflow from the low pressure compressor to the fan bypass passage.

Additionally or alternatively, in this or other embodiments a bleed pathway outlet at the outer radial wall is axially downstream from the outlet port.

Additionally or alternatively, in this or other embodiments the bleed airflow is isolated from the cooling airflow.

In yet another embodiment, a method of operating a gas turbine engine includes flowing an airflow through a fan portion of the gas turbine engine and along a fan bypass passage and directing a portion of the airflow through an inlet port of a low pressure compressor case and into a low pressure compressor compartment. The low pressure compressor compartment is defined by an inner radial wall and an outer radial wall of the low pressure compressor. The airflow is flowed across an electrical component disposed in the low pressure compressor compartment and the electrical component is cooled via a thermal energy exchange between the airflow and the electrical component.

Additionally or alternatively, in this or other embodiments the airflow is flowed from the low pressure compressor compartment into the fan bypass passage via an outlet port.

Additionally or alternatively, in this or other embodiments a temperature of the low pressure compressor compartment is maintained below an operational limit of the electrical component.

Additionally or alternatively, in this or other embodiments a bleed airflow is directed from a low pressure compressor to the fan bypass passage through the low pressure compressor compartment.

BRIEF DESCRIPTION OF THE DRAWINGS

The subject matter which is regarded as the present disclosure is particularly pointed out and distinctly claimed in the claims at the conclusion of the specification. The foregoing and other features, and advantages of the present disclosure are apparent from the following detailed description taken in conjunction with the accompanying drawings in which:

DETAILED DESCRIPTION

Figure 1:
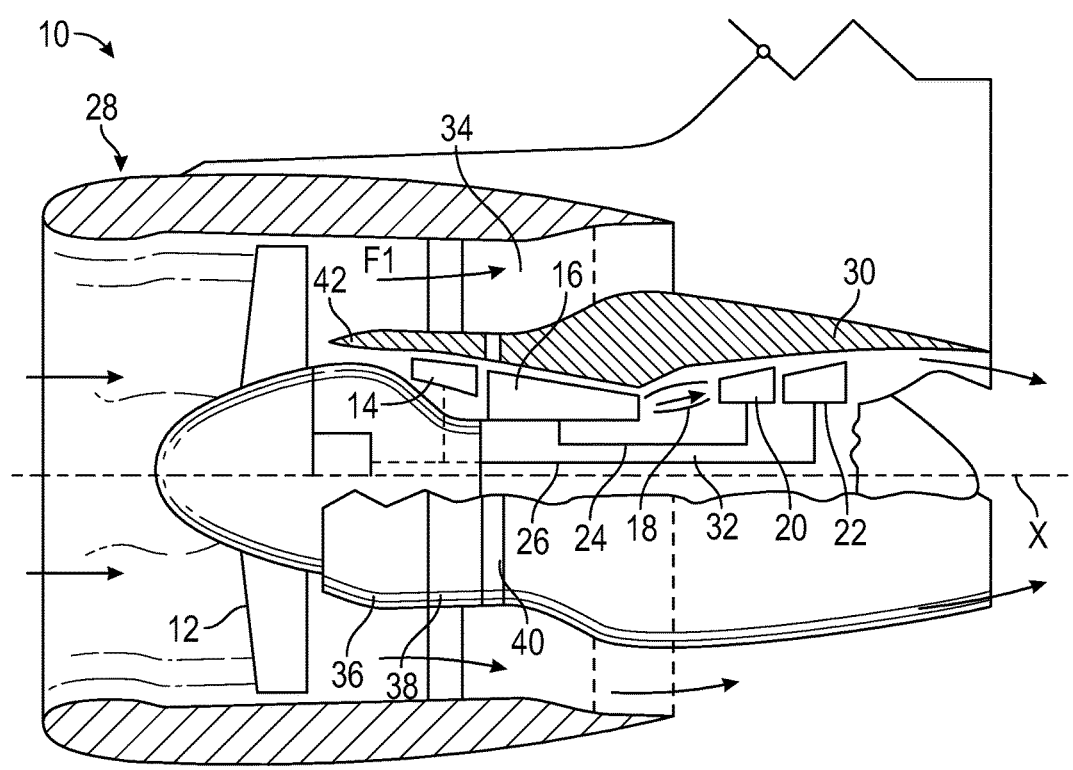
FIG. 1 illustrates a schematic cross-sectional view of an embodiment of a gas turbine engine.

FIG. 1 is a schematic illustration of a gas turbine engine 10. The gas turbine engine generally has includes fan section 12, a low pressure compressor 14, a high pressure compressor 16, a combustor 18, a high pressure turbine 20 and a low pressure turbine 22. The gas turbine engine 10 is circumferentially disposed about an engine centerline X. During operation, air is pulled into the gas turbine engine 10 by the fan section 12, pressurized by the compressors 14, 16, mixed with fuel and burned in the combustor 18. Hot combustion gases generated within the combustor 18 flow through high and low pressure turbines 20, 22, which extract energy from the hot combustion gases.

In a two-spool configuration, the high pressure turbine 20 utilizes the extracted energy from the hot combustion gases to power the high pressure compressor 16 through a high speed shaft 24, and the low pressure turbine 22 utilizes the energy extracted from the hot combustion gases to power the low pressure compressor 14 and the fan section 12 through a low speed shaft 26. The present disclosure, however, is not limited to the two-spool configuration described and may be utilized with other configurations, such as single-spool or three-spool configurations, or gear-driven fan configurations.

Gas turbine engine 10 is in the form of a high bypass ratio turbine engine mounted within a nacelle or fan casing 28 which surrounds an engine casing 30 housing an engine core 32. A significant amount of air pressurized by the fan section 12 bypasses the engine core 32 for the generation of propulsive thrust. The airflow entering the fan section 12 may bypass the engine core 32 via a fan bypass passage 34 extending between the fan casing 28 and the engine casing 30 for receiving and communicating a discharge flow F1. The high bypass flow arrangement provides a significant amount of thrust for powering an aircraft.

The engine casing 30 generally includes an inlet case 36, a low pressure compressor case 38, and an intermediate case 40. The inlet case 36 guides air to the low pressure compressor case 38, and via a splitter 42 also directs air through the fan bypass passage 34.

Figure 2:
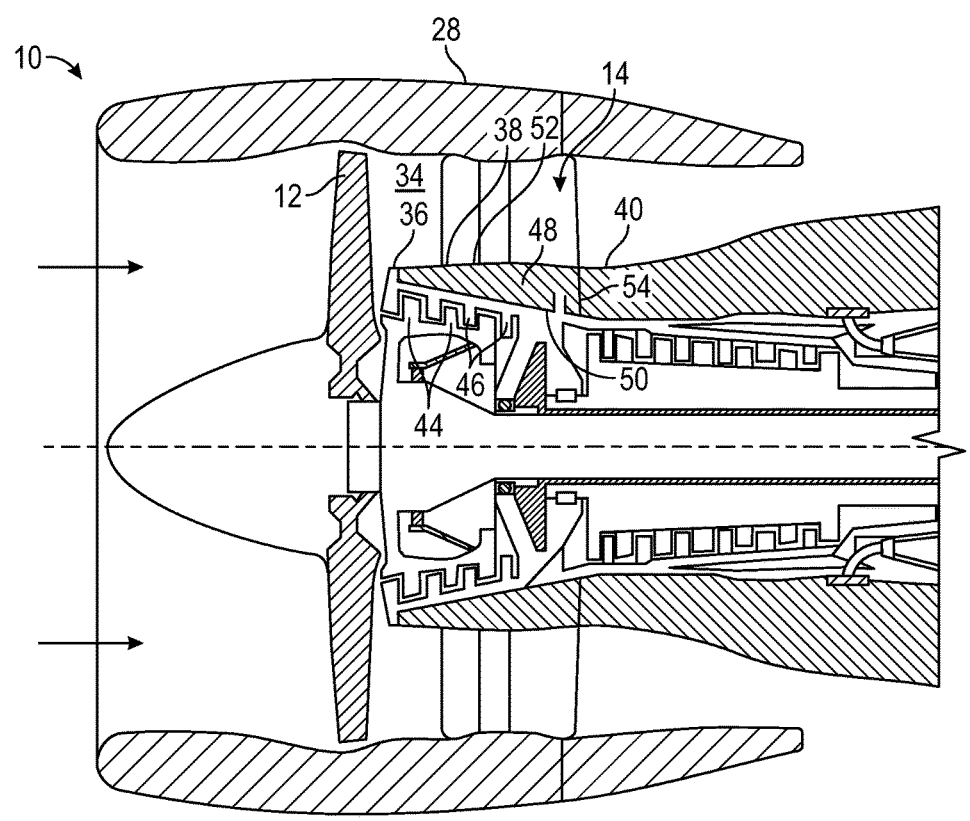
FIG. 2 illustrates a schematic cross-sectional view of an embodiment of a low pressure compressor of a gas turbine engine.

Referring now to FIG. 2, the low pressure compressor case 38 and/or the intermediate case 40 surrounds the low pressure compressor 14. The low pressure compressor 14 includes one or more low pressure compressor rotors 44, with one or more low compressor stators 46 located between adjacent low pressure compressor rotors 44. The low pressure compressor rotors 44 rotate about engine centerline X, driven by the low speed shaft 26 (shown in FIG. 1), while low pressure compressor stators 46 are fixed to the low pressure compressor case 38. The low pressure compressor case 38 and/or the intermediate case 40 define a low pressure compressor compartment 48 located radially between an inner casing wall 50 at which the low pressure compressor stators 46 are located, and an outer casing wall 52 located radially outboard of the inner casing wall 50 and at least partially defining the fan bypass passage 34. Further, an axial extent of the low pressure compressor compartment 48 defines a firewall 54 between the low pressure compressor 14 and the high pressure compressor 16.

Figure 3:
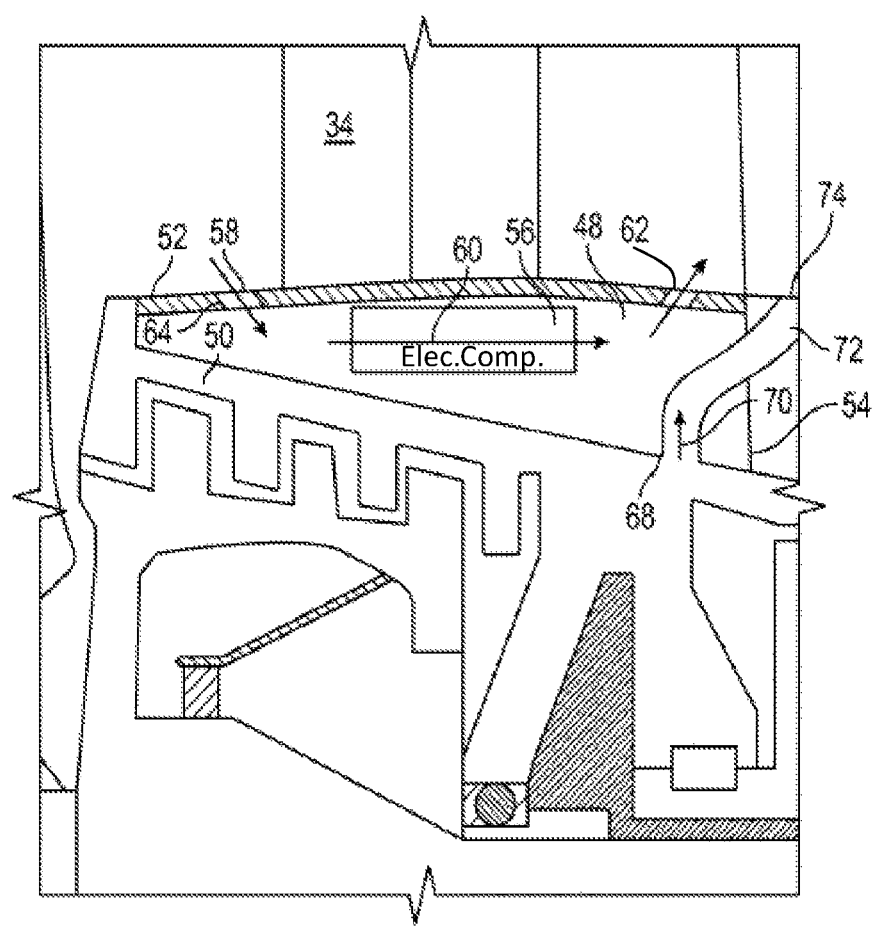
FIG. 3 is a schematic cross-sectional view of an embodiment of a low pressure compressor compartment of a gas turbine engine.

Referring now to FIG. 3, the present disclosure advantageously utilizes the low pressure compressor compartment 48 to house one or more electrical components, schematically shown at 56. The one or more electrical components 56 may include one or more of an electric oil pump, an electric fuel pump, electric low pressure compressor vane actuator, electric bleed actuator, electric ACC valve or the like, or electronic enclosures such as an electronic engine control component or a health monitoring unit. It is to be appreciated that the electrical components listed herein are merely exemplary, and one skilled in the art will readily appreciate that other electrical components not listed herein may also be located at the low pressure compressor compartment 48.

Electrical components 56 may be sensitive to elevated temperatures and also to thermal cycling. Thus, it is desired to not expose the electrical components 56 to temperatures above upper operational limits of the electrical components 56, in some embodiments about 160 degrees Fahrenheit (about 71 degrees Celsius), and to reduce thermal cycling as much as possible by reducing variations in the temperatures to which the electrical components 56 are exposed. To maintain temperature in the low pressure compressor compartment 48 below 160 degrees Fahrenheit, airflow from the fan bypass passage 34, which is typically at or slightly above ambient temperature, is flowed through the low pressure compressor compartment 48. To accomplish this, the low pressure compressor compartment 48 includes a plurality of inlet ports 58, which in some embodiments extend through the outer casing wall 52. The inlet ports 58 may vary in number, size, shape and/or location in an axial direction along engine centerline X, as well as circumferentially about engine centerline X in order to admit sufficient airflow into the low pressure compressor compartment 48 to maintain the electrical components 56 therein at or below a desired temperature. Further, the inlet ports 58 may include features such as a ram air scoop (not shown) to direct the cooling airflow 60 into the low pressure compressor compartment 48. This cooling airflow 60 admitted into the low pressure compressor compartment 48, exchanges thermal energy with the electrical components 56 to cool the electrical components 56. In some embodiments, the low pressure compressor compartment may include one or more baffles or other features (not shown) to direct the cooling airflow 60 toward the electrical components 56. The cooling airflow 60 then flows out of the low pressure compressor compartment 48 and back into the fan bypass passage 34 via a plurality of outlet ports 62. As with the inlet ports 58, the outlet ports 62 may vary in number, size, shape and/or location in an axial direction along engine centerline X, as well as circumferentially about engine centerline X in order to maintain sufficient airflow through the low pressure compressor compartment 48 to maintain the electrical components 56 therein at or below the desired temperature, and/or to maintain a substantially constant temperature in the low pressure compressor compartment 48 to minimize thermal cycling. Further, the outlet ports 62 are configured to return the cooling airflow 60 into the fan bypass passage 34 in a tangential direction to minimize losses. In an alternative embodiment, the cooling airflow 60 exiting the outlet ports 62 may be directed into a core nacelle or other engine location.

In some operating conditions, such as very low ambient operating temperatures, it may be desired to control, restrict or stop cooling airflow 60 from entering the low pressure compressor compartment 48. For this purpose, one or more flow controllers 64, such as valves or doors or the like may be located at the inlet ports 58. The flow controllers 64 may be operably configured to open or close depending on a temperature of airflow in the fan bypass passage 34 and/or a temperature of the low pressure compressor compartment 48, in some embodiments a temperature sensor (not shown) may be located at the fan bypass passage 34, the low pressure compressor compartment 48 or at the electrical components 56. While in the embodiment shown, the flow controllers 64 are located at the inlet ports 58, in other embodiments the flow controllers 64 may alternatively or additionally be located at the outlet ports 62. Further, the flow controllers 64 may be active and may include, for example, EEC controlled valves, or may be passive and open or close automatically based on sensed temperature in the low pressure compressor compartment 48.

In some embodiments, the low pressure compressor 14 further includes a bleed port 68 to divert airflow from the low pressure compressor 14 to the fan bypass passage 34. The bleed port 68 is utilized under certain operating conditions to bleed excess airflow from the low pressure compressor 14 to improve airflow characteristics entering the high pressure compressor 16. This bleed airflow 70 is flowed through the bleed port 68 and through the low pressure compressor compartment 48 through a bleed passage 72 to a bleed outlet 74 at the fan bypass passage 34. Because the bleed airflow 70 temperature is much higher than the cooling airflow 60 temperature, the bleed passage 72 is, for example, a tube or pipe or other formed passage such that the bleed airflow 70 is isolated from the cooling airflow 60 and that no mixing of the two occurs.

The bleed outlet 74 is located at the fan bypass passage 34 axially downstream of the outlet ports 62, and in some embodiments the bleed passage 72 extends through the firewall 54 so the bleed outlet 74 is located axially rearward of the firewall 54.

The configurations disclosed herein take advantage of underutilized space at the low pressure compressor compartment 48 to house the electrical components 56 and provide cooling airflow thereto. This allows for increased usage of electrical components while thermally protecting the electrical components to extend their service life. Further, the present disclosure allows for mounting certain components at the engine core 32, rather than at the fan case, thus streamlining the fan case structure.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

The invention claimed is:

1. A compressor section for a gas turbine engine, comprising:
   a low pressure compressor;
   a high pressure compressor; and
   a low pressure compressor case extending circumferentially around a central axis of the gas turbine engine, including:
   an inner radial wall surrounding a low pressure compressor rotor; and
   an outer radial wall at least partially defining a fan bypass passage of the gas turbine engine; and
   a low pressure compressor compartment disposed between the inner radial wall and the outer radial wall, the inner radial wall and the outer radial wall defining a cooling airflow passage therebetween;
   an electrical component disposed in the cooling airflow passage;
   an inlet port at the outer radial wall configured to admit a cooling airflow into the cooling airflow passage from the fan bypass passage to cool the electrical component via thermal energy exchange with the cooling airflow directed across the electrical component in the cooling airflow passage;
   an outlet port at the outer radial wall axially downstream of the inlet port to reintroduce the cooling airflow to the fan bypass passage; and
   a bleed pathway extending through the cooling airflow passage to direct a bleed airflow from the low pressure compressor to the fan bypass passage;
   wherein the bleed pathway extends through a firewall axially separating the low pressure compressor from the high pressure compressor, such that an outlet of the bleed pathway is disposed axially downstream of the firewall.

2. The compressor section of claim 1, wherein the electrical component is one or more of an electric oil pump, an electric fuel pump, an electric low pressure compressor vane actuator, an electric bleed actuator, an electric active clearance control valve, or an electronic enclosure of an electronic engine control component or a health monitoring unit.

3. The compressor section of claim 1, wherein the inlet port and the outlet port are configured to maintain a low pressure compressor compartment temperature of less than an upper operational limit of the electrical component.

4. The compressor section of claim 1, wherein the outlet of the bleed pathway at the outer radial wall is axially downstream from the outlet port.

5. The compressor section of claim 1, wherein the bleed airflow is isolated from the cooling airflow.

6. The compressor section of claim 1, wherein the electrical component is radially spaced from both the outer radial wall and the inner radial wall.

7. A gas turbine engine, comprising:
a combustor; and
a compressor to provide a compressed airflow to the combustor, the compressor including:
a high pressure compressor; and
a low pressure compressor including:
a low pressure compressor case extending circumferentially around a central axis of the gas turbine engine, including:
an inner radial wall surrounding a low pressure compressor rotor; and
an outer radial wall at least partially defining a fan bypass passage of the gas turbine engine; and
a low pressure compressor compartment disposed between the inner radial wall and the outer radial wall, the inner radial wall and the outer radial wall defining a cooling airflow passage therebetween;
an electrical component disposed in the cooling airflow passage;
an inlet port at the outer radial wall configured to admit a cooling airflow into the cooling airflow passage from the fan bypass passage to cool the electrical component via thermal energy exchange with the cooling airflow directed across the electrical component in the cooling airflow passage;
an outlet port at the outer radial wall axially downstream of the inlet port to reintroduce the cooling airflow to the fan bypass passage; and
a bleed pathway extending through the cooling airflow passage to direct a bleed airflow from the low pressure compressor to the fan bypass passage;
wherein the bleed pathway extends through a firewall axially separating the low pressure compressor from the high pressure compressor, such that an outlet of the bleed pathway is disposed axially downstream of the firewall.

8. The gas turbine engine of claim 7, wherein the electrical component is one or more of an electric oil pump, an electric fuel pump, an electric low pressure compressor vane actuator, an electric bleed actuator, an electric active clearance control valve, or an electronic enclosure of an electronic engine control component or a health monitoring unit.

9. The gas turbine engine of claim 7, wherein the inlet port and the outlet port are configured to maintain a low pressure compressor compartment temperature below an operational limit of the electrical component.

10. The gas turbine engine of claim 7, wherein the outlet of the bleed pathway at the outer radial wall is axially downstream from the outlet port.

11. The gas turbine engine of claim 7, wherein the bleed airflow is isolated from the cooling airflow.

12. A method of operating a gas turbine engine, comprising:
flowing an airflow through a fan portion of the gas turbine engine and along a fan bypass passage;
directing a portion of the airflow through an inlet port of a low pressure compressor case extending circumferentially around a central axis of the gas turbine engine and into a cooling airflow passage in a low pressure compressor compartment, the cooling airflow passage defined by an inner radial wall and an outer radial wall of the low pressure compressor;
flowing the portion of the airflow across an electrical component disposed in the cooling airflow passage;
cooling the electrical component via a thermal energy exchange between the electrical component and the portion of the airflow directed across the electrical component in the cooling airflow passage; and
directing a bleed airflow along a bleed pathway from the low pressure compressor to the fan bypass passage through the cooling airflow passage;
wherein the bleed pathway extends through a firewall axially separating the low pressure compressor from a high pressure compressor, such that an outlet of the bleed pathway is disposed axially downstream of the firewall.

13. The method of claim 12, further comprising flowing the airflow from the low pressure compressor compartment into the fan bypass passage via an outlet port.

14. The method of claim 12, further comprising maintaining a temperature of the low pressure compressor compartment below an operational limit of the electrical component.

* * * * *